(12) United States Patent
Beechie et al.

(10) Patent No.: US 9,896,044 B2
(45) Date of Patent: Feb. 20, 2018

(54) SYSTEM AND METHOD FOR VEHICLE RANGE EXTENSION ON DETECTION OF A LOW FUEL CONDITION

(75) Inventors: Brian E. Beechie, Armada, MI (US); John D. Mueller, Southfield, MI (US); Jeffrey M. Orzechowski, Troy, MI (US); Anurag Peter Varma, Royal Oak, MI (US); Mary R. Gerber, West Bloomfield, MI (US); Troy J. Davis, Marine City, MI (US); Glenn F. Syrowik, Holly, MI (US)

(73) Assignee: FCA US LLC, Auburn Hills, MI (US)

( * ) Notice: Subject to any disclaimer, the term of this patent is extended or adjusted under 35 U.S.C. 154(b) by 2215 days.

(21) Appl. No.: 12/641,746

(22) Filed: Dec. 18, 2009

(65) Prior Publication Data

US 2011/0153141 A1 Jun. 23, 2011

(51) Int. Cl.
*B60R 16/023* (2006.01)
*B60W 10/06* (2006.01)
(Continued)

(52) U.S. Cl.
CPC ......... *B60R 16/0236* (2013.01); *B60W 10/06* (2013.01); *B60W 10/10* (2013.01);
(Continued)

(58) Field of Classification Search
CPC ....... B60Q 1/00; F02D 28/00; F02D 19/0628; F02D 29/02; F02D 19/0623; F02D 19/0665; F02D 19/084; F02D 19/087; G06F 17/00; B60L 11/126; B60L 11/123; B60L 11/02; B60K 15/077; B60C 23/005; B60C 23/0408; B60C 23/20; B60R 16/0236; B60R 21/013; B60W 10/06; B60W 20/15; G01F 23/00; G07C 5/10; G07C 5/00; E02F 9/26; F02N 11/0829; G06K 19/0717; G08G 1/017; G08G 1/164
(Continued)

(56) References Cited

U.S. PATENT DOCUMENTS 5,995,886 A * 11/1999 Tanaka ................. B60K 15/077
340/457.4
6,791,203 B1 9/2004 Matsubara et al.
(Continued)

FOREIGN PATENT DOCUMENTS

DE 19902949 8/2000
DE 10109058 9/2002
(Continued)

*Primary Examiner* — Behrang Badii
(74) *Attorney, Agent, or Firm* — Ralph E Smith

(57) ABSTRACT

The technology described herein provides a system and method for automatically increasing the remaining driving range of a vehicle when a low fuel or other condition is detected by altering the operating parameters of one or more vehicle systems to improve propulsion system efficiency and thereby lower fuel consumption. The vehicle range extending system is capable of altering the operating parameters of any vehicle system, including for example variable displacement settings, start-stop technology settings, and HVAC operation. The disclosed technology can also provide information to the driver, suggesting which system operating parameters should be altered to reduce the fuel consumption rate.

20 Claims, 4 Drawing Sheets

(51) Int. Cl.
*B60W 10/10* (2012.01)
*B60W 10/30* (2006.01)
*B60W 30/18* (2012.01)
*B60W 30/182* (2012.01)
*B60W 50/08* (2012.01)
*B60W 50/14* (2012.01)
*G01F 9/00* (2006.01)
*G01F 9/02* (2006.01)

(52) U.S. Cl.
CPC .......... *B60W 10/30* (2013.01); *B60W 30/18* (2013.01); *B60W 30/182* (2013.01); *B60W 50/082* (2013.01); *B60W 50/085* (2013.01); *B60W 50/14* (2013.01); *G01F 9/001* (2013.01); *G01F 9/023* (2013.01); *B60W 2560/02* (2013.01); *Y02T 10/84* (2013.01)

(58) Field of Classification Search
USPC .......................................................... 701/29
See application file for complete search history.

(56) References Cited

U.S. PATENT DOCUMENTS

| | | | |
|---|---|---|---|
| 6,961,656 B2 | 3/2005 | Kim | |
| 6,909,947 B2* | 6/2005 | Douros et al. | 701/29 |
| 6,925,369 B2* | 8/2005 | Obayashi | B60R 16/023 |
| | | | 701/22 |
| 7,103,460 B1* | 9/2006 | Breed | B60C 23/0408 |
| | | | 701/29.1 |
| 7,259,664 B1* | 8/2007 | Cho | B60L 11/126 |
| | | | 180/65.265 |
| 7,289,611 B2* | 10/2007 | Iggulden et al. | 379/102.03 |
| 7,693,651 B2* | 4/2010 | Proefke | B60W 50/08 |
| | | | 340/450.2 |
| 2003/0144779 A1* | 7/2003 | Obayashi et al. | 701/36 |
| 2005/0052080 A1* | 3/2005 | Maslov et al. | 307/10.1 |
| 2006/0025897 A1* | 2/2006 | Shostak | B60C 23/005 |
| | | | 701/1 |
| 2006/0243043 A1* | 11/2006 | Breed | B60C 23/041 |
| | | | 73/146 |
| 2007/0225900 A1* | 9/2007 | Kropp | 701/201 |
| 2009/0299857 A1* | 12/2009 | Brubaker | G06Q 30/02 |
| | | | 705/14.66 |
| 2010/0106514 A1* | 4/2010 | Cox | G01C 21/20 |
| | | | 705/1.1 |
| 2011/0066352 A1* | 3/2011 | Blanchard | F02D 19/0628 |
| | | | 701/102 |

FOREIGN PATENT DOCUMENTS

| | | |
|---|---|---|
| DE | 10138750 | 2/2003 |
| EP | 2028059 | 12/2009 |

* cited by examiner

SYSTEM AND METHOD FOR VEHICLE RANGE EXTENSION ON DETECTION OF A LOW FUEL CONDITION

FIELD OF THE INVENTION

The technology herein relates generally to engine, transmission and general vehicle system calibration, and more particularly to a system and method for increasing the remaining driving range of the vehicle when a low fuel condition is detected.

BACKGROUND OF THE INVENTION

Motor vehicles have long used fuel level sensors to provide the driver with an indication of a remaining fuel level. In recent years, adaptations to on-board trip computers (such as the one described in U.S. Pat. No. 6,961,656) have allowed for the display of an estimated range or a distance to empty ("DTE") indicator based on a fluctuating fuel consumption rate and a detection of remaining fuel level.

Although these systems provide the driver with an indication of low fuel and DTE, they do not provide any information to the driver about what can be done to increase the remaining range when the remaining fuel is limited. Moreover, existing systems are incapable of improving the remaining range by actively managing fuel consumption when critical fuel conditions are detected. Even a small improvement in the fuel consumption rate may make a critical difference in reaching a refueling station that the vehicle would otherwise be unable to reach.

BRIEF SUMMARY OF THE INVENTION

In various example embodiments, the technology described herein provides a system and method for automatically increasing the remaining driving range of a vehicle when a low fuel condition is detected by altering the operating parameters of one or more vehicle systems to improve propulsion system efficiency and thereby lower fuel consumption. Vehicle systems are targeted in order of the amount of their effect on propulsion system efficiency to reduce overall fuel consumption. In one embodiment, system operating parameters are sequentially altered until a desired decrease in fuel consumption rate is achieved. In another embodiment, operating parameters within groups of vehicle systems are altered as successive fuel conditions are detected.

For example, when the vehicle is equipped with variable displacement engine technology and a low fuel condition is detected, the system automatically modifies the displacement setting to the lowest available number of cylinders. In another example, the system modifies transmission calibration so as to promote low-RPM gear shifting, or create artificial redlines for automatic gearshifts. The system can also activate a transmission fuel saver mode, to the extent one is available. In yet another example, for vehicles equipped with start/stop technology, the system will activate a more aggressive start/stop strategy, e.g., turning off the engine whenever a sustained period of braking is detected. In hybrid vehicles, the start-stop system might be altered so that the vehicle operates entirely on battery power below certain speeds.

The range extending system is capable of altering the operating parameters of any vehicle system. Further examples of the vehicle systems targeted for improving propulsion system efficiency include climate control (e.g., deactivating air conditioning, increasing blower temperature, decreasing blower speed, activating re-circulation) and audio (e.g., lowering the stereo volume, decreasing available stereo channels). The system is also capable of reducing general energy demand by turning off or dimming displays (e.g., turning non critical displays to off or black), turning off daytime running lights, dimming interior lighting and deactivating power outlets. In short, the present system allows adjustment to any system to improve propulsion system efficiency.

In one embodiment, the vehicle range extending system is automatically activated when calculated DTE is zero. However, other embodiments may have the vehicle range extending system activate at any DTE, including at the same time a low fuel indication is provided to the driver. In yet another embodiment, the vehicle range extending system can be activated manually, or the driver can be provided with the ability to program the DTE at which the system will be activated. Generally, the system is deactivated when the vehicle is refueled, however, in one embodiment the driver can be presented with a prompt to deactivate the system after refueling is detected. In one embodiment, the vehicle range extending system can interface with a navigation system installed in the vehicle so that when a range extending mode is active, the navigation system either automatically locates and plans a route to the nearest refueling station, or adds the nearest refueling station as a waypoint.

In another example embodiment, the technology maximizes vehicle range in low fuel conditions by providing to the driver a low fuel detection indication, and information regarding which vehicle systems the driver should activate or deactivate to improve propulsion system efficiency. Alternatively, the technology can display ideal operating conditions to help driver extend vehicle range.

In another embodiment, the technology provides information regarding operating parameters the driver can use to reduce vehicle fuel consumption in normal operating conditions.

There has thus been outlined, rather broadly, the features of the technology in order that the detailed description that follows may be better understood, and in order that the present contribution to the art may be better appreciated. There are additional features of the technology that will be described and which will form the subject matter of the claims. Additional aspects and advantages of the technology will be apparent from the following detailed description of an example embodiment which is illustrated in the accompanying drawings. The technology is capable of other embodiments and of being practiced and earned out in various ways. Also, it is to be understood that the phraseology and terminology employed are for the purpose of description and should not be regarded as limiting.

BRIEF DESCRIPTION OF THE DRAWINGS

The technology is illustrated and described herein with reference to the various drawings, in which like reference numbers denote like method steps and/or system components, and in which.

DETAILED DESCRIPTION OF THE INVENTION

Before describing the disclosed embodiments of the technology in detail, it is to be understood that the technology is not limited in its application to the details of the particular arrangement shown here since the technology is capable of other embodiments. Also, the terminology used herein is for the purpose of description and not of limitation.

Figure 1:
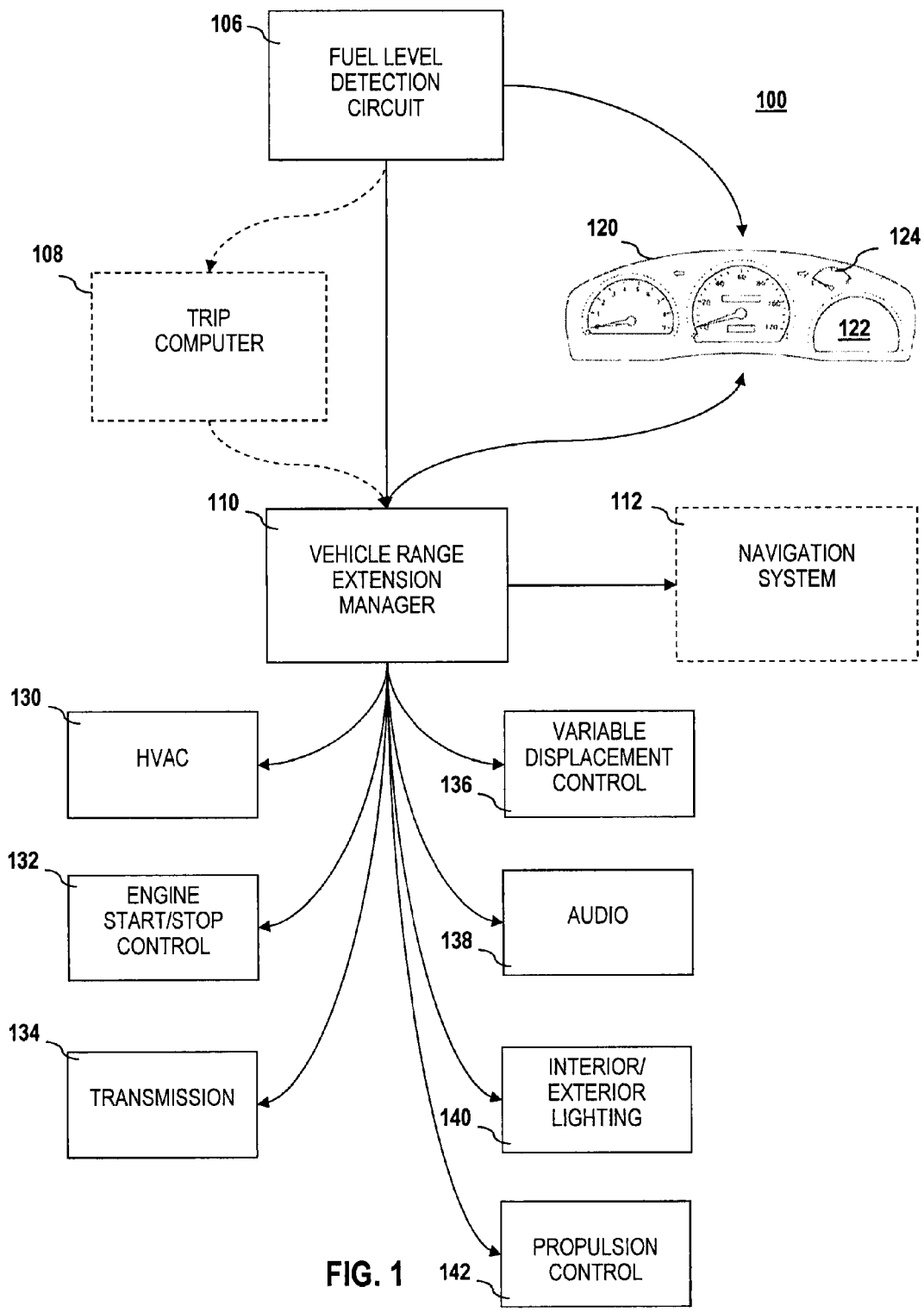
FIG. 1 shows an example system for increasing vehicle range according to an embodiment described herein.

FIG. 1 shows a vehicle range extension system 100 comprising a vehicle range extension manager 110 that monitors an output from a fuel level detection circuit 106. When a predetermined fuel condition is detected, the vehicle range extension manager 110 is capable of altering the operating parameters of certain vehicle systems 130-140 so as to decrease the fuel consumption rate of the vehicle. Example vehicle systems that may have their operating parameters altered (it is understood that systems may be activated and deactivated completely in addition to having their settings changed) include an HVAC system 130, an engine start/stop control system 132, a transmission system 134, a variable displacement control system 136, an audio system 138 and an interior and exterior lighting system 140. It is further understood that every vehicle may have a different configuration of vehicle systems; accordingly, the examples provided above are understood to be non-limiting, and that the vehicle range extension manager 110 could alter any connected vehicle system to improve propulsion system efficiency.

Any number of alterations can be made to reduce the overall fuel consumption rate of the vehicle. For instance, when the vehicle is equipped with the variable displacement control system 136, the vehicle range extension manager 110 can automatically modify the engine's displacement setting to the lowest available number of cylinders. In addition to, or alternatively, for the transmission system 134, the vehicle range extension manager 110 can promote low-RPM gear shifting, or create artificial redlines for automatic gearshifts. Or, the torque converter lock-up clutch or electronically actuated clutch engagement strategy could be made to be more aggressive. Optionally, the vehicle range extension manager 110 could alter settings of a propulsion control system 142 to limit driver access to high throttle application, e.g., full throttle, unless full throttle is specifically requested by the driver. The vehicle range extension manager 110 can also activate a transmission fuel saver mode, to the extent one is available. For vehicles equipped with an engine start/stop control system 132 (i.e., where the engine can be turned on and off on demand), the vehicle range extension manager 110 can activate a more aggressive start/stop strategy, e.g., turning off the engine whenever a sustained period of braking is detected. In hybrid vehicles, the engine start/stop control system 132 might be altered so that the vehicle operates entirely on battery power at or below certain speeds.

In addition to, or alternatively, for the HVAC system 130, the vehicle range extension manager 110 can deactivate air conditioning, increase blower temperature, decrease blower speed and activate re-circulation, all of which alters the net effect of the HVAC system 130 on propulsion system efficiency. For the audio system 138, the vehicle range extension manager 110 can lower the stereo volume or decrease available stereo channels. The vehicle range extension manager 110 is also capable of reducing general energy demand by, e.g., dimming or turning off displays (turning non critical displays to black), deactivating power outlets, and turning off daytime running lights (interior and exterior lighting 140).

An optional trip computer 108 provides the vehicle range extension manager 110 with an estimated distance to empty (DTE), based on the output from the fuel level detection circuit 106. It is understood that the distance to empty calculation can be calibrated so as to display a DTE of zero when there is still some fuel in the tank. This is an attempt to prevent driver from unintentionally reaching a no fuel condition while driving. Conveniently, it also provides a potential fuel condition when the vehicle range extension manager 110 should be activated.

It is understood that, in other embodiments, the vehicle range extension manager 110 can be programmed to activate at any DTE, including at the same time a low fuel indication is provided to the driver. Further, the vehicle range extension manager 110 can be programmed to be activated manually, and the driver can also be provided with the ability to program the DTE at which the vehicle range extension manager 110 will be activated.

The vehicle range extension manager 110 is optionally capable of interfacing with a navigation system 112 installed in the vehicle. In one embodiment, when a range extending mode is active, the vehicle range extension manager 110 can send commands to the navigation system 112 to cause the navigation system 112 to automatically locate and plan a route to the nearest refueling station, or add the nearest refueling station as a waypoint to the current route. The navigation system 112 can also be programmed to automatically determine whether or not the vehicle is capable of reaching a nearest fueling station and automatically activating the vehicle range extension manager 110 when the result of that determination is within a defined distance threshold that can optionally be set be the driver. The threshold could be any distance, but one example would have the vehicle range extension manager 110 activated whenever fuel level of the vehicle is less than 3 miles more than the distance to the refueling station.

Also included in the vehicle range extension system 100 is a connection to the vehicle's dashboard 120, which generally has a fuel level indicator 124 and a common display element 122 for indicating or communicating information to the driver. It is understood that vehicle range extension manager 110 can display information to the driver on the display element 122. A prompt to activate the vehicle range extension system 100 can also be displayed on display element 122. The vehicle range extension manager 110 is not limited to use with display element 122, however, and any display in the vehicle, e.g., on a navigation system, can be used.

Figure 2:
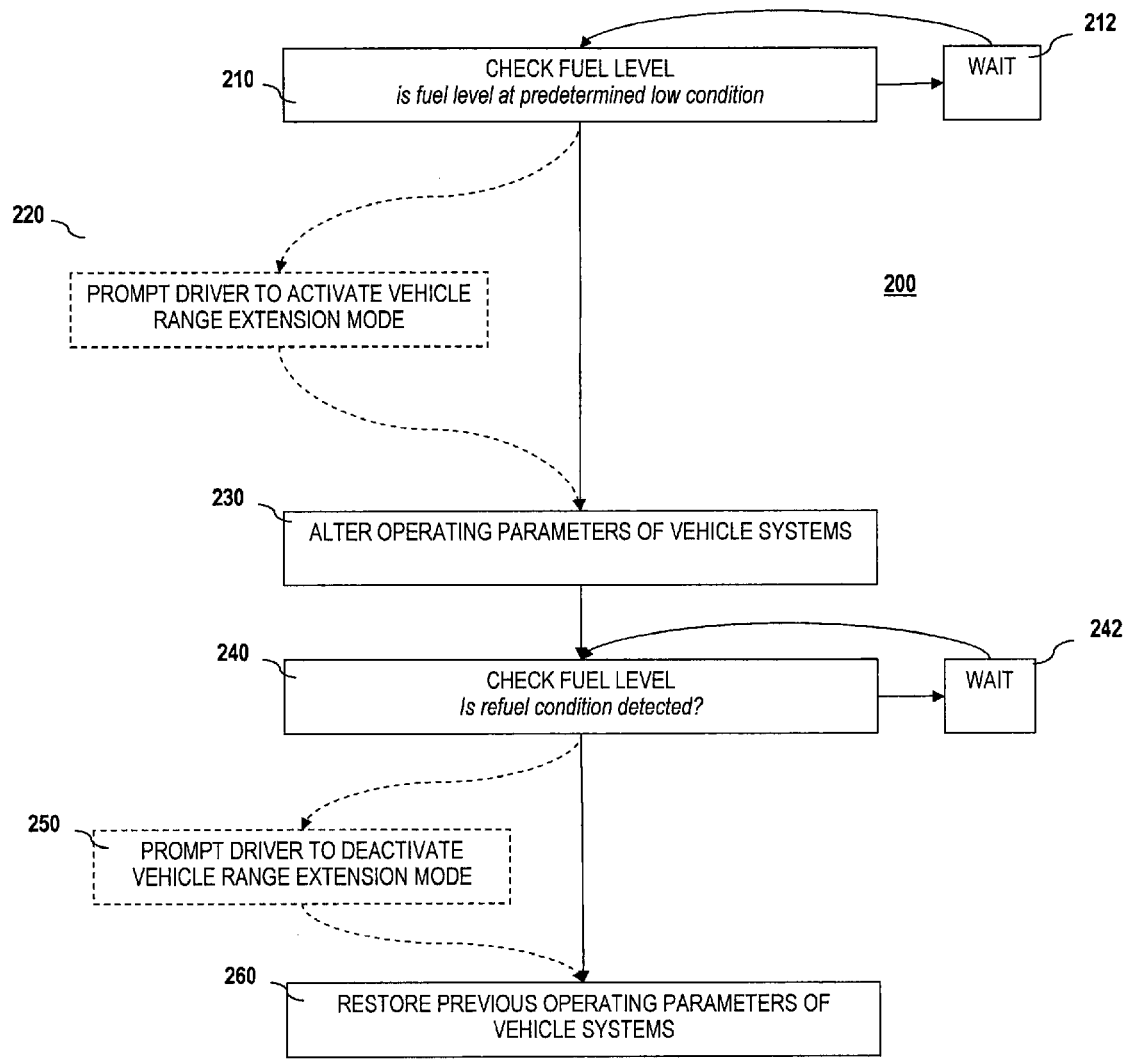
FIG. 2 shows an example process, performed by the FIG. 1 system, by which fuel consumption rate is decreased when a fuel condition is detected according to an embodiment described herein.

Referring now to FIG. 2, a method 200 performed by the vehicle range extension system 100 to decrease overall fuel consumption of a vehicle when a predetermined fuel condition is detected is now described. As a first step 210, the fuel level of the vehicle is checked to determine if it is below or equal to a predetermined fuel condition. In the event that fuel level is above the predetermined fuel condition, a waiting step 212 is taken. Steps 210 and 212 are understood to be repeated until the predetermined fuel condition is detected.

Once the predetermined fuel condition is detected the vehicle range extension system 100, at step 230, alters the operating parameters of a plurality of vehicle systems (as described above). An optional step 220 provides a prompt to the driver to manually activate the vehicle range extension system 100. The vehicle range extension system 100 actively monitors, at steps 240 and 242, whether the vehicle is being or has been refueled. If a refueling condition is detected the vehicle range extension system 100 at step 260 restores the operating parameters of the various affected vehicle systems to their original state. An optional step 250 provides a prompt to the driver to manually deactivate the vehicle range extension system 100.

Figure 3:
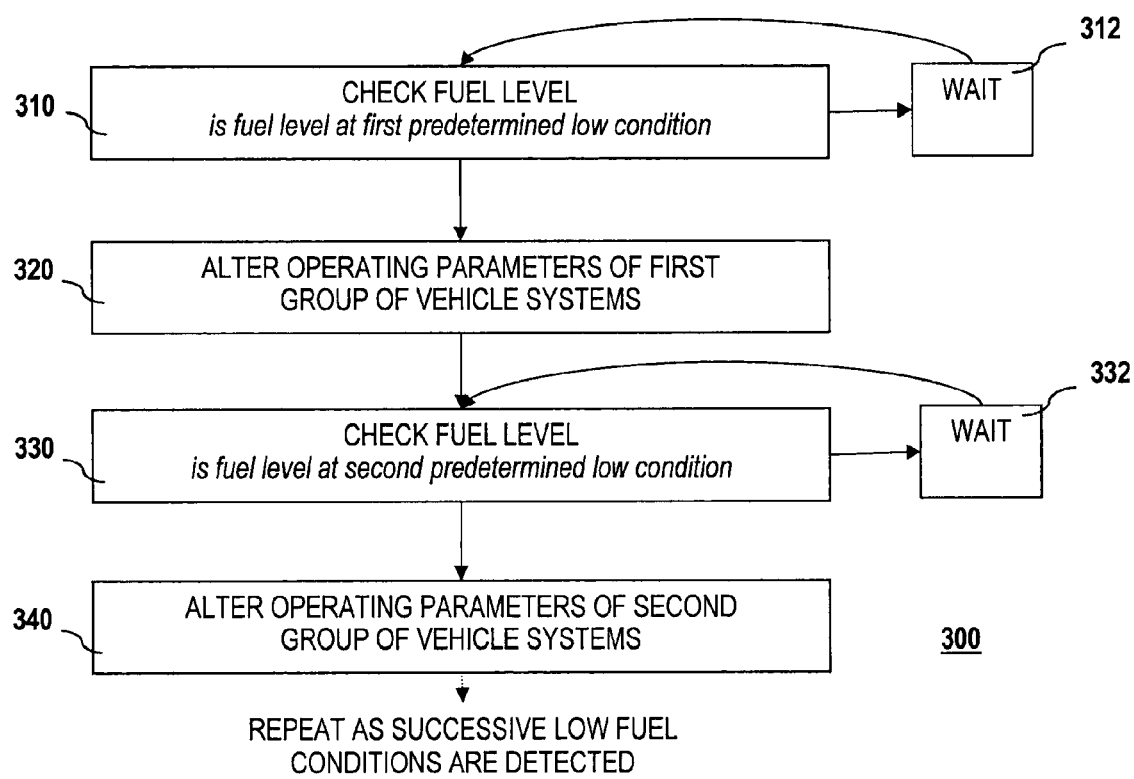
FIG. 3 shows another example process, performed by the FIG. 1 system, by which fuel consumption rate is decreased when a fuel condition is detected according to an embodiment described herein.

Referring now to FIG. 3, another example embodiment of a method 300 performed by the vehicle range extension system 100 to decrease overall fuel consumption of a vehicle when a predetermined fuel condition is detected is now described. As before, the vehicle range extension system 100 monitors, at steps 310 and 312, for the detection of a first predetermined fuel condition. On detection of the first predetermined fuel condition at step 320, the vehicle range extension system 100 alters the operating parameters of a first group of vehicle systems (as described above). In this embodiment, the vehicle range extension system 100 is operable to monitor at steps 330 and 332 for a second and further predetermined fuel condition. When those predetermined fuel conditions are detected, at step 340, the operating parameters of a further corresponding group of vehicle systems are altered.

Figure 4:
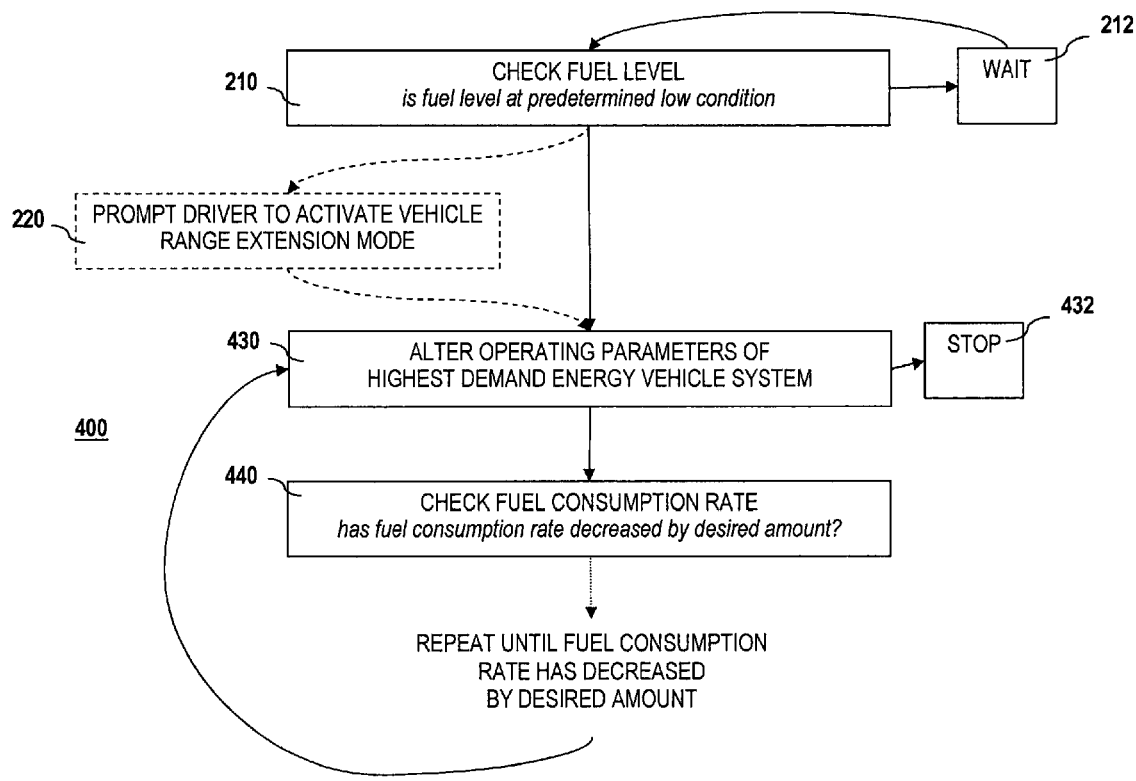
FIG. 4 shows yet another example process, performed by the FIG. 1 system, by which fuel consumption rate is decreased when a fuel condition is detected according to an embodiment described herein.

Referring now to FIG. 4, yet another example embodiment of a method 400 performed by the vehicle range extension system 100 to decrease overall fuel consumption of a vehicle when a predetermined fuel condition is detected is now described. As above, steps 210, 212 and 220 are performed to initialize operation of the vehicle range extension system 100. However, instead of altering a plurality of operating parameters simultaneously at steps 430 and 440, the vehicle range extension system 100 alters the operating parameters of vehicle systems sequentially until the fuel consumption rate of the vehicle decreases by a predetermined amount. In one embodiment, the operating parameters are altered in order of their expected effect on the fuel consumption rate of the vehicle. That is, the parameters associated with the highest/largest effect on propulsion system efficiency are altered first. In another embodiment, operating parameters are altered until the fuel consumption rate is decreased by a predetermined percentage, which may be hard set and/or programmed by the driver through a display, e.g., display element 122.

With both the FIG. 3 and FIG. 4 embodiments, vehicle range extension system 100 is operable to be automatically or manually deactivated upon detection of a refueling condition. It should be appreciated that the methods 200, 300, and 400 of FIGS. 2-4 are all functions that can be performed by the system 100 of FIG. 1.

It should also be appreciated that any or all of the fuel level detection circuit 106, trip computer 108 or vehicle range extension manager 110 can be implemented as software stored on a storage medium within the vehicle and run on the vehicle's computer system or in specialized hardware. It is further understood that vehicle range extension manager 110 could be programmed by integration of a wireless or cellular network interface (not pictured).

Although the above described system and method employs fuel level detection, it is understood that the technology could be used to alter vehicle system operating parameters with any other consumables (e.g., a level of oil, washer fluid, anti-freeze, transmission fluid, brake pad thickness, or battery life) or detectable vehicle states (e.g., engine temperature or tire pressure).

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology and are intended to be covered by the following claims.

What is claimed is:

1. A system for extending driving range of a vehicle, comprising:
a fuel level detection circuit; and
a vehicle range extension manager connected to the fuel level detection circuit and operable to activate when a predetermined fuel condition is detected, the vehicle range extension manager being further operable to alter at least one operating parameter, based on detection of the predetermined fuel condition, of at least one vehicle system so as to decrease a fuel consumption rate of the vehicle by a predetermined amount.

2. The system of claim 1, wherein the predetermined fuel condition is a low fuel level.

3. The system of claim 1, further comprising a trip computer operable to determine an estimated distance to empty from an output of the fuel level detection circuit, wherein the predetermined fuel condition corresponds to estimated distance to empty of zero.

4. The system of claim 1, further comprising an interface for an operator of the vehicle to set the predetermined fuel condition at which the vehicle range extension manager will be activated.

5. The system of claim 1, wherein a plurality of operating parameters on a plurality of vehicle systems are altered so as to decrease a fuel consumption rate of the vehicle.

6. The system of claim 5, wherein operating parameters are altered in order of expected effect on the fuel consumption rate of the vehicle.

7. The system of claim 5, wherein operating parameters are altered sequentially until the fuel consumption rate of the vehicle decreases by the predetermined amount.

8. The system of claim 7, wherein the predetermined amount is a percentage of the fuel consumption rate at the time the vehicle range extension manager is activated.

9. The system of claim 1, wherein the vehicle range extension manager is automatically deactivated when the vehicle is refueled.

10. The system of claim 5, wherein the vehicle systems are organized into groups and the operating parameters within the groups are altered sequentially as a plurality of successively lower predetermined fuel levels are detected.

11. The system of claim 1, further comprising a navigation system connected to the vehicle range extension manager and operable to receive a command from the vehicle range extension manager when the predetermined fuel condition is detected to either automatically locate and plan a route to a nearest refueling station or add the nearest refueling station as a waypoint to a current route.

12. The system of claim 11, wherein the navigation system is further operable to determine whether or not the vehicle is capable of reaching a nearest fueling station based on a current fuel level of the vehicle and automatically activates the vehicle range extension manager when the result of that determination is within a defined distance threshold.

13. The system of claim 1, wherein the at least one vehicle system is one of a variable displacement control system, a transmission system, an HVAC system, an audio system, a propulsion control system, and an engine start-stop control system.

14. A method of extending driving range of a vehicle comprising:

detecting a predetermined fuel condition; and altering at least one operating parameter, based on detection of the predetermined fuel condition, of at least one vehicle system so as to decrease a fuel consumption rate of the vehicle by a predetermined amount.

15. The method of claim 14, wherein the predetermined fuel condition corresponds to an estimated distance to empty of zero.

16. The method of claim 14, wherein a plurality of operating parameters on a plurality of vehicle systems are altered so as to decrease a fuel consumption rate of the vehicle.

17. The method of claim 16, wherein the altering step comprises altering the operating parameters of vehicle systems sequentially until the fuel consumption rate of the vehicle decreases by the predetermined amount.

18. The method of claim 16, wherein the vehicle systems are organized into groups and operating parameters within the groups are altered sequentially as a plurality of successively lower predetermined fuel levels are detected.

19. The method of claim 14, wherein the at least one vehicle system is one of a variable displacement control system, a transmission system, an HVAC system, an audio system, a propulsion control system, and an engine start-stop control system.

20. The method of claim 14, further including a step of prompting a driver of the vehicle before the at least one operating parameter is altered.

* * * * *